United States Patent

[11] 3,549,795

[72] Inventor Frank J. Mullin
Freehold Township, Monmouth County, N.J.
[21] Appl. No. 783,844
[22] Filed Dec. 16, 1968
[45] Patented Dec. 22, 1970
[73] Assignee Bell Telephone Laboratories, Incorporated
Murray Hill, N.J.
a corporation of New York

[54] AUDIO SQUELCH CIRCUIT FOR TIME DIVISION DIPLEXED TELVISON
6 Claims, 3 Drawing Figs.

[52] U.S. Cl. 178/5.6, 325/478
[51] Int. Cl. H04n 5/21
[50] Field of Search 178/5.6, 5.8, 6AVC, 6NS; 325/341, 348, 402, 403, 411, 408, 478, 473, 477, 419, 456, 421; 307/247; 328/195, 93; 343/203; 340/171, 171X, 172, 172X

[56] References Cited
UNITED STATES PATENTS

| | | | |
|---|---|---|---|
| 2,602,855 | 7/1952 | Cunningham | 178/5.8 |
| 2,632,800 | 3/1953 | Schlesinger | 325/478 |

*Primary Examiner*—Robert L. Griffin
*Assistant Examiner*—Alfred H. Eddleman
*Attorneys*—R. J. Guenther and E. W. Adams, Jr.

ABSTRACT: The horizontal sync pulses of a composite television signal in which the audio information is time division diplexed onto the video signal are applied to drive at the horizontal sweep rate an astable multivibrator that would, if allowed, run free at a significantly lower frequency. The output of the multivibrator, after passing through a bandpass filter tuned to a harmonic of the free running frequency, operates a gate to short the audio output. The audio output is therefore squelched whenever the horizontal sync pulses are degraded enough to allow the multivibrator to run free.

PATENTED DEC 22 1970

3,549,795

COMPOSITE SIGNAL RECEIVER

INVENTOR
F. J. MULLIN
BY John P. McDonnell
ATTORNEY

PATENTED DEC 22 1970 3,549,795

AUDIO SQUELCH CIRCUIT FOR TIME DIVISION DIPLEXED TELVISON

BACKGROUND OF THE INVENTION

This invention relates to television transmission systems in which the audio signal is diplexed onto the video signal. More particularly, it relates to audio squelch circuits for such transmission systems.

In the conventional transmission of television signals between the television studio and a broadcast transmitter, or between broadcast transmitters, the video and the audio portions of a television program are transmitted over separate communication channels by cable or microwave radio. Two major disadvantages arise from this system—two channels are more costly than a single channel, and there is a greater probability that a portion of the program will be lost through transmission channel malfunction with two channels than with a single channel. To overcome these disadvantages, several systems have been devised in which both sound and picture information may be sent over a single channel in the form of a single composite signal. These systems typically make use of the horizontal blanking interval in the video signal for transmitting the sound information and therefore come within the general definition of time division diplex systems. One such system is described in a copending application, Ser. No. 476,313, now U.S. Pat. No. 3,423,520, filed Aug. 2, 1965 by Hugh P. Kelly and assigned to the assignee of this application. In Kelly's system, the sound information is located on the "-front porch" of the horizontal sync pulse. That is, the video signal is modulated by the audio signal during that portion of the horizontal blanking interval that just precedes the horizontal sync pulse. Almost any type of modulation may be used—frequency, pulse amplitude, pulse position, pulse width, pulse code. Pulse amplitude modulation is perhaps the simplest, and with a single pulse every horizontal blanking interval, a theoretical audio bandwidth of 7,875 kHz can be transmitted. Other diplexing systems use the "back porch," or the horizontal sync pulse interval itself. Since the adoption of the NTSC color transmission standard, of course, the back porch is reserved for color information and is no longer available for sound information.

Each of these systems is fairly effective in rejecting most of the transmission noise from the audio output. Each requires, however, a clearly defined timing pulse, such as the horizontal sync pulse, as a reference point for audio demodulation. When this reference pulse is obscured because of either signal fading or high amplitude noise superimposed on the signal, the audio demodulator generates so much audible noise that it is objectionable to listeners. Some type of audio noise squelching is therefore a necessity.

Audio squelch circuits are, of course, well known. In frequency modulation radio receivers which utilize automatic gain control, audio squelching is used to eliminate the high level audio noise that is otherwise emitted while the receiver is being tuned between stations. Such squelch circuits typically detect the carrier signal amplitude and mute the audio output when the carrier signal drops below an acceptable level. That type of squelch circuit would be effective to mute the audio in a time division diplexed television transmission system when the signal fades, but it would be totally ineffective when the sync pulses were strong but obscured by noise.

Other audio squelch circuits operate on the audio signal itself. The problem then arises of distinguishing between the desired audio program and undesired audio noise. Various schemes exist for separating portions of the audio band, either by frequency or by amplitude, which are less likely to contain the audio program signal and using the level of the separated portions to determine when the audio output should be muted. Such schemes tend to be complicated and expensive, however, and also to remove a portion of the audio program signal.

An object of this invention is, therefore, to mute the audio output of a time division diplexed television transmission system during periods of either severe signal fading or high noise.

Another object is to mute the audio output of a time division diplexed television system during periods of audio demodulation noise.

A third object is to provide a simple, effective, audio squelch circuit with an adjustable squelch level for a time division diplexed television transmission system, Still another object is to provide a strong output signal from a television receiver whenever the horizontal synchronization becomes erratic.

SUMMARY OF THE INVENTION

In the present invention an astable multivibrator that has a free running frequency less than the repetition rate of reference pulses, which may be the horizontal sync pulses, is driven to initiate prematurely a cycle of oscillation in the multivibrator in response to each reference pulse. The multivibrator is thereby synchronized to the repetition rate of the reference pulses, which as noted, may be the horizontal sweep frequency. A filter connected to the output of the multivibrator rejects the horizontal sweep frequency and its harmonics but passes at least a frequency which is a harmonic of the free running frequency of the multivibrator. A gating circuit connected to the output of the filter mutes the audio output when the output of the filter exceeds a predetermined level. Audio muting is therefore accomplished whenever the multivibrator generates output at its free running frequency, i.e., whenever the horizontal sync becomes erratic or is lost altogether.

BRIEF DESCRIPTION OF THE DRAWINGS

Other objects and features of the present invention will readily be apparent from the following discussion and drawings in which.

DETAILED DESCRIPTION

Figure 1:
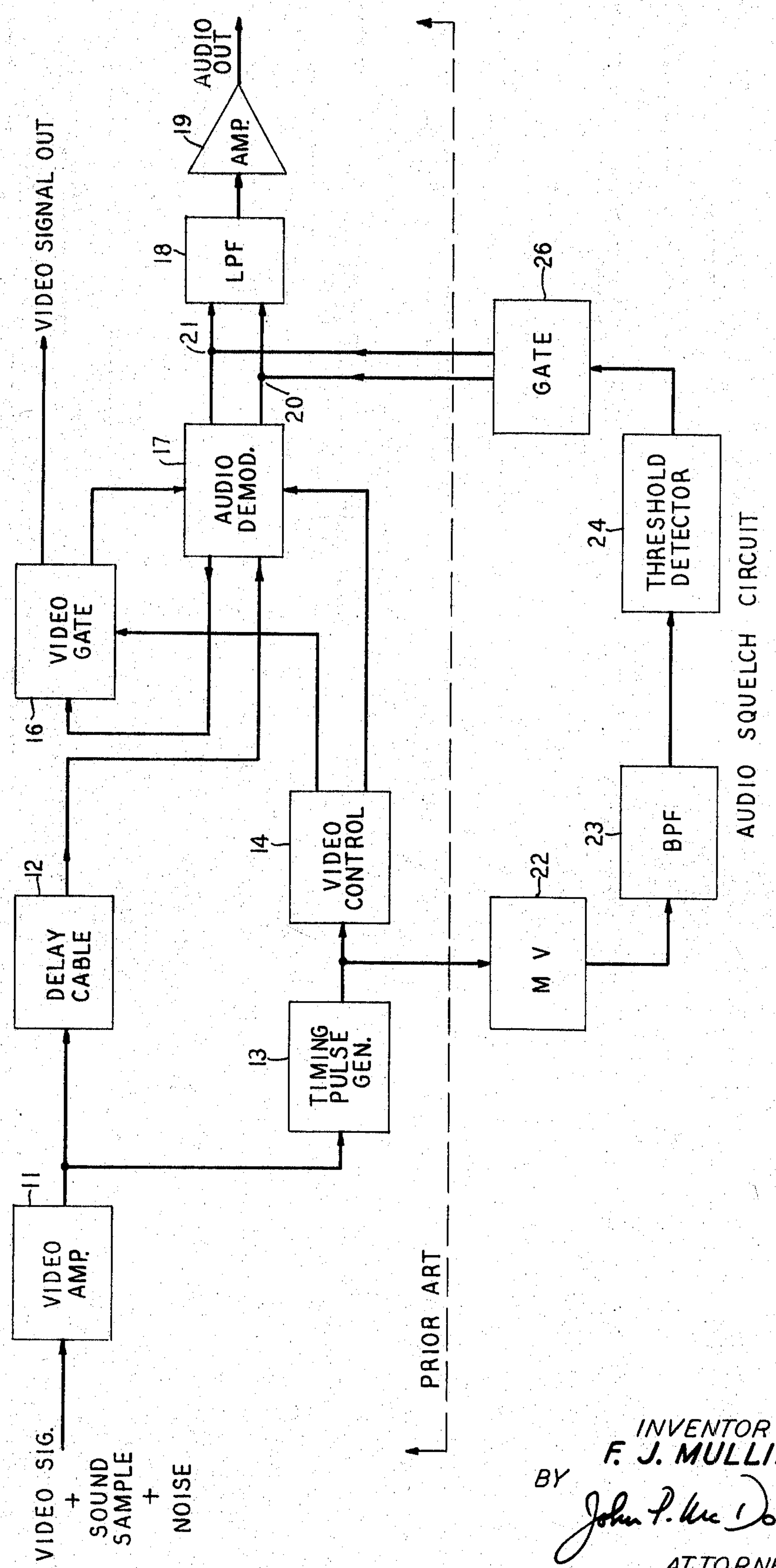
FIG. 1 is a block diagram of a time division diplexed television receiver including an embodiment of the audio squelch circuit of the present invention.

FIG. 1 illustrates in block form a receiver for separating the audio and video signals from a composite signal in which the audio signal is diplexed onto the front porch of the horizontal sync pulse of the video signal. The portion of the receiver which has been drawn below the dashed line is an embodiment of the audio squelch circuit of the present invention.

In the receiver illustrated, the composite television signal containing video, audio, and noise components is fed from a single transmission channel into a video amplifier 11. Besides boosting the amplitude of the composite signal to a usable level, amplifier 11 may provide equalization to offset some of the distortion caused by the transmission channel. The composite signal output of amplifier 11 is fed simultaneously to a delay cable 12 and a timing pulse generator 13. Pulse generator 13 emits a sharp pulse in response to each horizontal sync pulse of the composite signal. These timing pulses are fed to the video control circuit 14 and the audio squelch circuit of the present invention. Video control circuit 14 emits two control signals, one to a video gate 16 and another to an audio demodulator 17. The output of delay cable 12 is fed through audio demodulator 17, where that portion of the composite signal that contains the audio information is removed, to video gate 16, where the original blanking signal is restored. The output from video gate 16, therefore, is the standard television video signal as it is normally transmitted by a separate channel. Since the series of steps in the control chain that activates audio demodulator 17 and video gate 16 is initiated by the horizontal sync pulses of the composite signal, demodulator 17 and gate 16 cannot operate in real time before the horizontal sync pulses. When the audio information is on the front porch, therefore, preceding the horizontal sync pulses, delay cable 12 delays the entire composite signal long enough to allow the demodulator and video gate to be activated by the time the front porch reaches them. If the audio information were on the back porch, delay cable 12 would obviously not be necessary. Audio demodulator 17 compares the audio information it removed from the composite signal with a reference signal derived from video gate 16 to provide an audio signal output. For the purpose of explaining the muting action of the squelch circuit of the invention, the audio signal output from demodulator 17 is shown double ended that is, on two conductors 20 and 21. Finally, the audio signal is processed by a low-pass filter 18 and an amplifier 19 to provide a standard audio signal out.

The audio squelch circuit of the present invention as illustrated in FIG. 1 acts on the pulse output from timing pulse generator 13 and the audio output from audio demodulator 17. The timing pulses are fed to an astable multivibrator 22 to prematurely trigger the multivibrator with each pulse prior to time at which the multivibrator would normally change its state if allowed to run free. Since the timing pulses are derived from the horizontal sync pulses of the composite signal, they operate to synchronize the multivibrator to the horizontal sweep rate, normally 15.75 kHz. In the absence of timing pulses, multivibrator 22 runs free at a somewhat lower frequency; 13 kHz has been found to be satisfactory. The output of multivibrator 22 is fed through a band-pass filter 23 to a threshold detector 24, which in turn operates a muting gate 26. Band-pass filter 23 passes the free running frequency of multivibrator 22, or a harmonic thereof, but rejects the horizontal sweep frequency and its harmonics. A filter which has a 2.5 kHz, three decibel bandwidth centered at 39 kHz has been found to operate well to distinguish between a free running frequency of 13 kHz and a driven frequency of 15.75 kHz. When the throughput of the band-pass filter exceeds a given level, as determined by threshold detector 24, it operates gate 26 to mute the output from audio demodulator 17. Gate 26 may open the audio signal path, short circuit the audio output, or merely attenuate the audio signal. Whenever the horizontal sync pulses of the received composite TV signal are well enough defined, timing pulse generator 13 emits an unbroken series of pulses, and multivibrator 22 remains synchronized to the horizontal sweep rate. The output of band-pass filter 23 therefore remains below the threshold of threshold detector 24, gate 26 remains unoperated and the audio output if is unaffected. When the horizontal sync pulses deteriorate, however, because of signal fading or noise interference, so that the timing reference needed for good audio recovery becomes erratic, multivibrator 22 begins to generate signal components at 13 kHz and its harmonics. When horizontal sync is lost altogether, multivibrator 22 runs free at 13 kHz. The output of band-pass filter 23 thereupon rises abruptly to exceed the threshold, and gate 26 operates to mute the audio output. The squelch circuit of the invention is therefore very simple and inexpensive, and yet provides good snap action muting, well correlated with the major cause of audio noise—poor timing reference for audio recovery.

In receiving systems where there is no circuit analogous to timing pulse generator 13, multivibrator 22 may be synchronized to the horizontal sweep frequency by other well known equivalent circuitry, such as a sync separator and amplifier. In the transmission system of the Kelly application referred to heretofore, a timing pulse which precedes the diplexed audio information is sent from the transmitter as part of the composite signal. This timing pulse may, of course, be separated and used to drive multivibrator 22.

Figure 2:
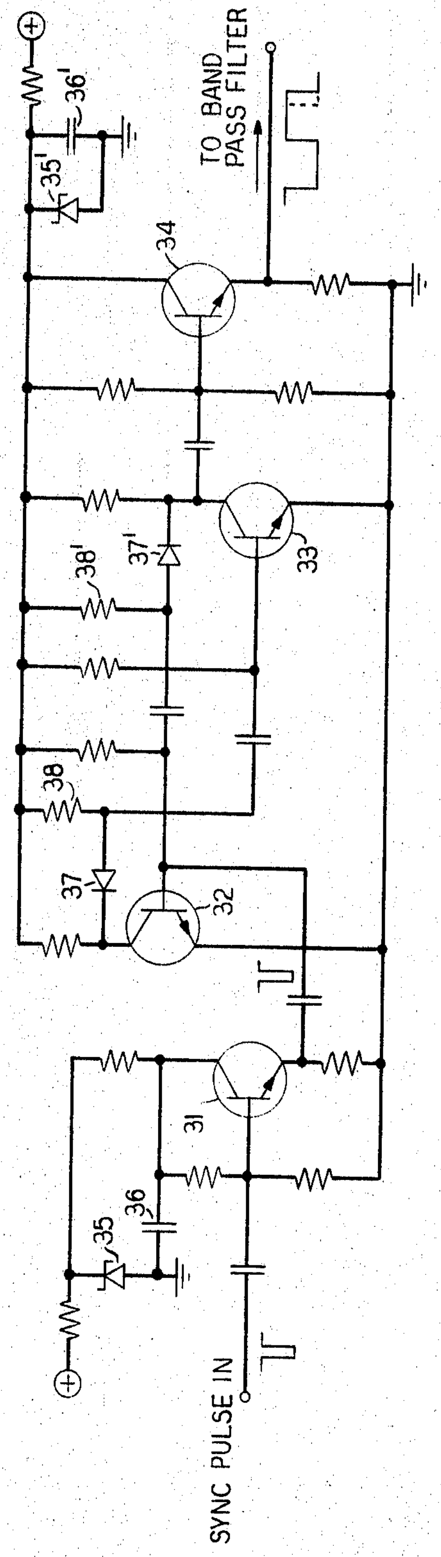
FIG. 2 is a circuit diagram of a multivibrator which may be used in the embodiment of FIG. 1; and, FIG. 3 is a circuit diagram of a threshold detector and shorting gate which may be used in the embodiment of FIG. 1.

A circuit which may conveniently be used for multivibrator 22 is shown in the schematic diagram of FIG. 2. It will be readily recognized that the circuit of FIG. 2 includes a first transistor 31 connected as an input emitter follower, a pair of transistors 32 and 33 connected as a collector coupled astable multivibrator, and a fourth transistor 34 connected as an output emitter follower. The input emitter follower provides a high impedance input to prevent loading of timing pulse generator 13 and a low impedance output to provide sufficient drive to the multivibrator. The output emitter follower likewise provides a high impedance input to prevent overloading of the multivibrator and a low impedance output to provide sufficient drive to the band-pass filter 23. The collector voltage supplied to each emitter follower may conveniently be stabilized by a zener diode 35, 35' and a capacitor 36, 36'. The cross coupling circuits of the multivibrator between each collector and the opposite base electrode may advantageously include a diode 37, 37' in series with the usual coupling capacitor and poled to allow positive current flow into the respective collector electrode. An additional resistor 38, 38' must then be connected between the current source and each diode-capacitor junction. As explained in detail on page 441 of the text Pulse, Digital, and Switching Waveforms by Millman and Taub, McGraw-Hill, 1965, this arrangement allows the capacitor current to flow through the added resistors 38 and 38' rather than the collector resistors. The collector voltage waveform is thereby made straightsided with sharp corners. This is particularly desirable for high third harmonic generation.

In operation, in the absence of sync pulses, the multivibrator continually oscillates in the well known astable manner to provide a square waveform out of emitter follower transistor 34 at 13 kHz. This waveform has a high third harmonic content at 39 kHz. The negative going pulses from timing pulse generator 13, however, are applied through emitter follower transistor 31 to the base of multivibrator transistor 32 without a phase change. Each pulse of sufficient magnitude prematurely turns off transistor 32 to start a new multivibrator s cycle. When the horizontal sync pulses of the composite signal are clear and well defined, therefore, a new multivibrator cycle is started with every horizontal line, and the output from emitter follower transistor 34 is a somewhat asymmetrical rectangular waveform with very low 39 kHz content.

The art of producing band-pass filters is well enough developed that one may readily be designed or purchased to meet the requirement of passing the free running frequency of the multivibrator or one of its harmonics and rejecting the horizontal sync frequency and its harmonics. As a consequence, the details of band-pass filter 23 are not shown.

Figure 3:
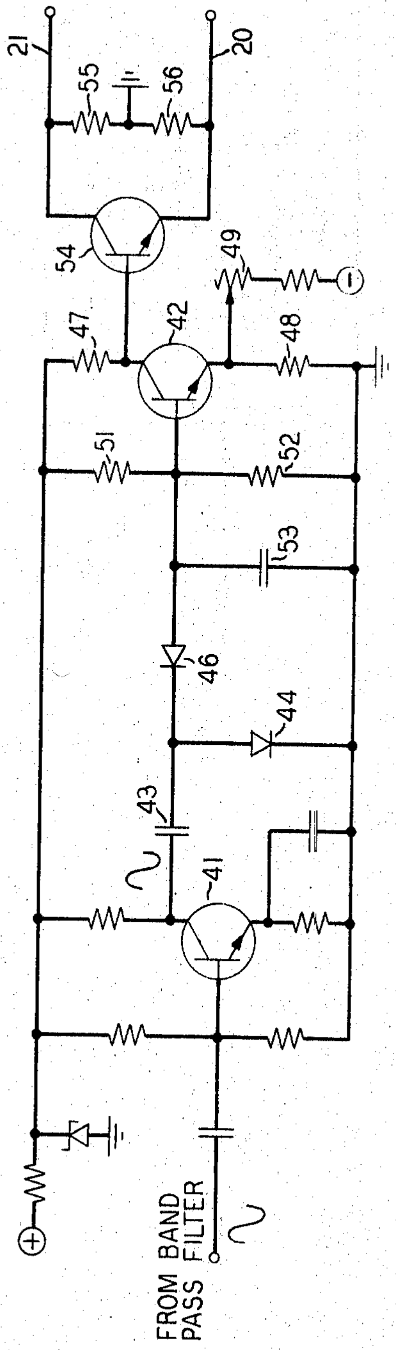

FIG. 3 is a schematic diagram of a circuit which may advantageously be used for threshold detector 24 and gate 26. Threshold detector 24 utilizes two transistors 41 and 42. Transistor 41 is connected as an ordinary common emitter amplifier with the input signal capacitor-coupled to its base and the output taken from its collector. Transistor 42 functions as a voltage comparator. A capacitor 43 and a diode 44 are connected in series between the collector of transistor 41 and ground. A second diode 46 is connected between the base of transistor 42 and the junction between diode 44 and capacitor 43 in voltage doubler fashion. The diodes are poled to allow positive current to flow toward ground. A load resistor 47 connects the collector of transistor 42 to the current supply and an emitter resistor 48 connects its emitter to ground. A variable resistor 49 connects the emitter of transistor 42 to a negative voltage supply to produce a variable voltage divider with resistor 48. A pair of resistors 51 and 52 connect the base of transistor 42 with the current supply and ground respectively. Finally, a filter capacitor 53 shunts resistor 52 and completes the voltage doubler circuit connected between the collector of transistor 41 and the base of transistor 42.

Gate 26 is made up of a transistor 54 with its base electrode connected to the collector of transistor 42 and its emitter-collector path connected across the two conductors of the audio signal from audio demodulator 17. A pair of resistors 55 and 56 connect each conductor respectively to ground to maintain line balance and provide a bias current path for transistor 54.

The threshold detector and gate function as follows: The 39 kHz output from band-pass filter 23 is amplified by transistor 41 and applied to voltage doubler capacitor 43. The half wave voltage doubler action produces a negative voltage at the base of transistor 42 which is proportional to and approximately three to four times the amplitude of the 39 kHz signal fed into transistor 41. Transistor 42 is normally conducting. When the voltage developed at its base by the voltage doubler circuit exceeds the negative bias applied to its emitter through resistor 49, transistor 42 turns off. Its collector voltage promptly rises to turn on transistor 54 and short circuit the audio conductors 20 and 21. An adjustment of variable resistor 49 produces an adjustment in the emitter bias voltage applied to transistor 42, and hence the amplitude of 39 kHz signal from band-pass filter 23 at which audio muting occurs. Since the level of 39 kHz signal is related to the demodulation noise level, variable resistor 49 provides a convenient adjustment of maximum noise level.

It is to be understood that the above-described arrangement is merely illustrative of the application of the principles of the invention. Numerous other arrangements may be devised by those skilled in the art without departing from the spirit and scope of the invention.

I claim:

1. In a receiving system adapted to recover the signal components from a time division multiplexed composite signal that includes reference pulses having a predetermined time relationship to the signal components, apparatus for muting at least one component signal output upon deterioration of said reference pulses comprising an astable multivibrator having a free running frequency of oscillation less than the repetition rate of said reference pulses, synchronizing means for prematurely initiating each cycle of oscillation in said multivibrator in response to an individual one of said reference pulses to synchronize said multivibrator to the repetition rate of said reference pulses, filter means connected to the output of said multivibrator for rejecting the repetition frequency of said reference pulses and its harmonics and passing a frequency which is a harmonic of said free running frequency, and gating means connected to the output of said filter means and said one component signal output for muting said one component signal output when the output of said filter means exceeds a predetermined level.

2. Muting apparatus as in claim 1 wherein said composite signal is a television signal having video and audio signal components, said reference pulses are horizontal sync pulses, and said one component signal is the audio signal.

3. Muting apparatus as in claim 2 wherein said filter means passes the third harmonic of said free running frequency.

4. Muting apparatus as in claim 2 wherein said gating means includes a threshold detector comprising rectifying means for producing a DC voltage proportional to the amplitude of signal output from said filter means, a source of reference potential, and comparing means connected to said rectifying means and said source of reference potential for producing an output whenever said DC voltage exceeds said reference potential.

5. Muting apparatus as in claim 3 wherein the repetition rate of said reference pulses is substantially 15.75 kHz and said free running frequency is substantially 13 kHz.

6. Muting apparatus as in claim 4 wherein said gating means includes a shorting gate for shorting said audio output in response to an output from said comparing means.